United States Patent

[11] 3,563,497

[72] Inventor Gene C. Holmes
 5708 Briarcliff Road, Los Angeles, Calif. 90028
[21] Appl. No. 789,164
[22] Filed Jan. 6, 1969
[45] Patented Feb. 16, 1971

[54] FLIGHT CONTROL MEANS FOR ROTORCRAFT
 8 Claims, 6 Drawing Figs.
[52] U.S. Cl. .................................................... 244/12, 244/17.19
[51] Int. Cl. ............................................................ B64c 29/00
[50] Field of Search ............................................... 244/4, 6, 7, 12, 15, 23, 17.19

[56] References Cited
UNITED STATES PATENTS

| | | | | |
|---|---|---|---|---|
| 1,922,167 | 8/1933 | Leray | | 244/17.19 |
| 2,461,435 | 2/1949 | Neumann | | 244/23(X) |
| 2,881,989 | 4/1959 | Flettner | | 244/6 |
| 3,002,709 | 8/1961 | Cochran | | 244/15(X) |
| 3,048,353 | 8/1962 | Holmes | | 244/23 |
| 3,171,614 | 3/1965 | Holmes | | 244/17.19 |
| 3,241,791 | 3/1966 | Piasecki | | 244/17.19 |

Primary Examiner—George E.A. Halvosa
Assistant Examiner—James E. Pittenger
Attorney—Lyon & Lyon ABSTRACT: The present invention provides an improved control system for rotorcraft such as helicopters, autogiros or similar aircraft having both a rotor and a propeller whereby the craft may also be capable of flight in the manner of a fixed wing aircraft with the rotor operative or held stationary. The invention includes means for introducing and discharging air under pressure upon the control surfaces whether the aircraft is under power or not so that good control of the craft is maintained even in the event of a power failure. The invention further includes air ducting means to augment the ascent and descent capabilities of the craft.

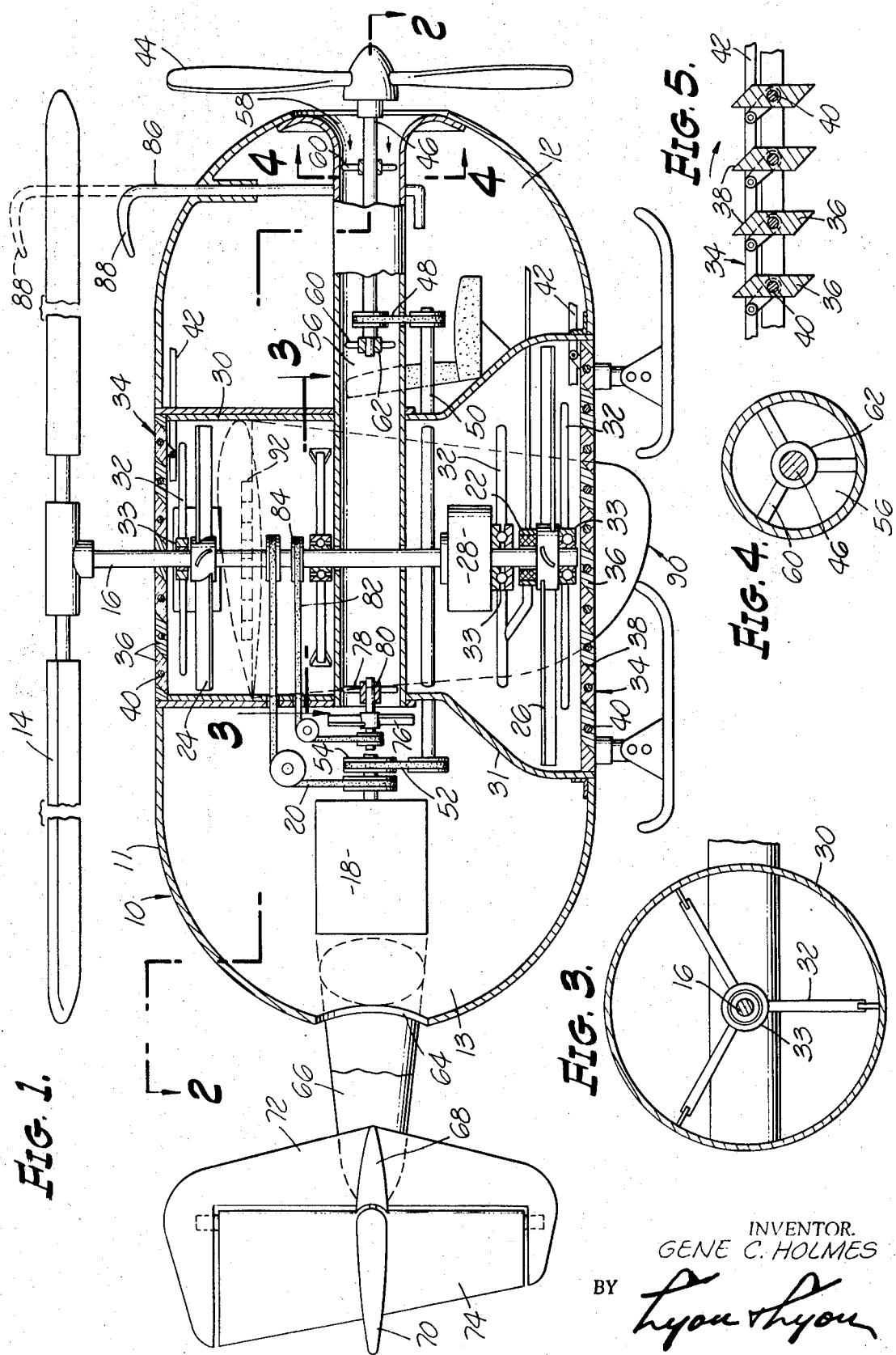

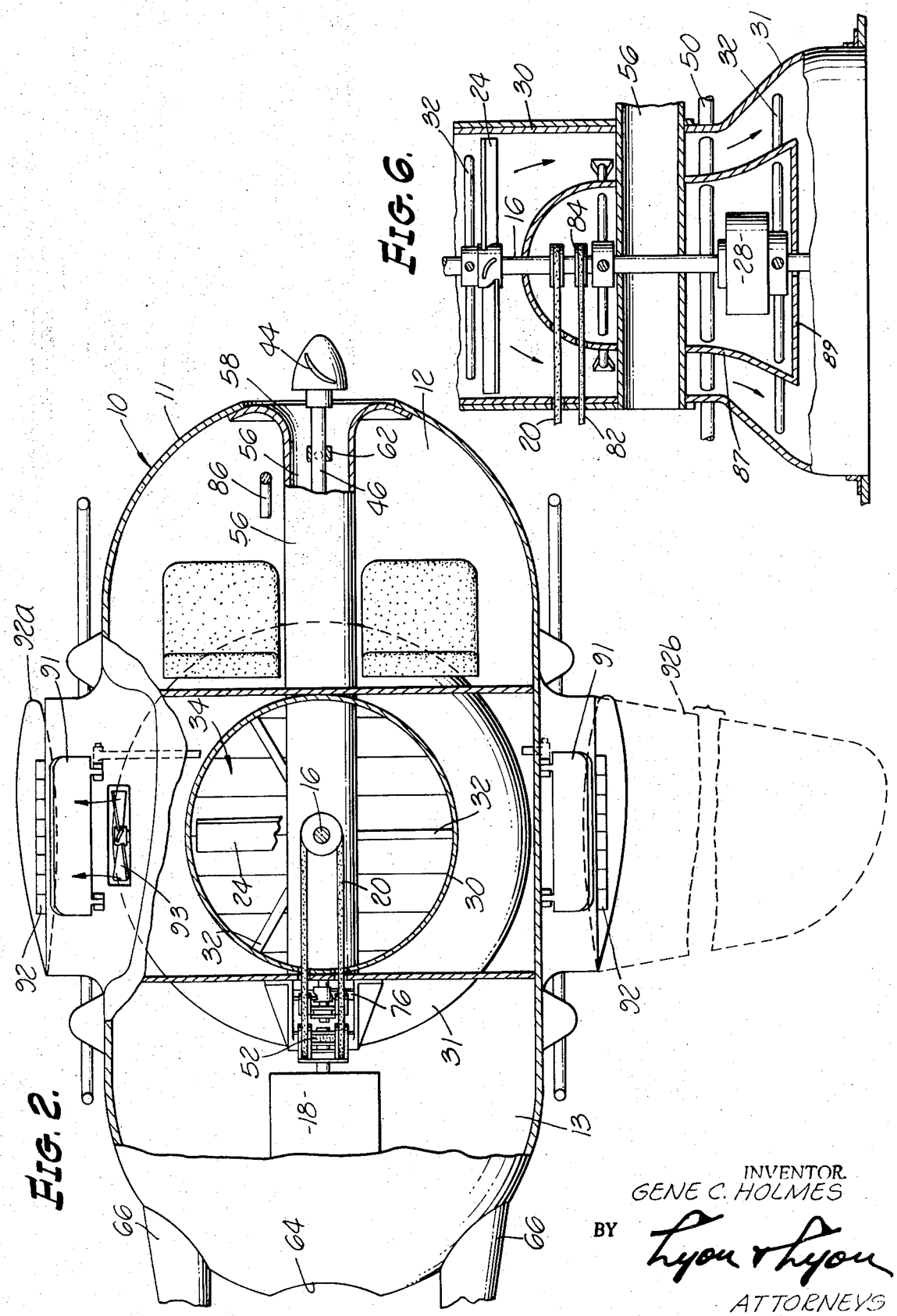

FLIGHT CONTROL MEANS FOR ROTORCRAFT

BACKGROUND OF THE INVENTION

This invention is directed to improvements over the devices disclosed and claimed in my prior U.S. Pat. No. 3048353 and No. 3171614 both of which are directed to improvements in the means for controlling the flight of the helicopters or autogiros.

SUMMARY OF THE INVENTION

The improvements disclosed by the present invention include means for permitting a rotorcraft to perform as a fixed wing aircraft by braking the rotor and holding it in a nonrotative position coupled with the extension of small wings. The wings may be folded up during operation as a rotorcraft or left extended as desired; however, better performance during ascent and descent may be obtained with the wings in folded position. The invention also comprises an improved vertical ducting passage including shutters for closing this vertical passage during horizontal flight. The vertical passage improves the lift-off and ascent capabilities of the craft and also creates an air cushion during descent for more easily controlled landings. The improved vertical air ducting means includes secondary rotors to enhance the lift-off capabilities of the device. In addition to the foregoing, the provision of a horizontal air duct permits the application of air under pressure on the control surfaces, i.e., the rudder and elevator surfaces for added controllability, and the improved air ducting includes means for applying such air under pressure even in the event of a power failure.

It is an object, therefore, of the present invention to provide improved control means for rotorcraft or the like whereby the craft may be flown with or without its wings extended and is fully controllable during power-off descents. It is also an object of the present invention to provide improved control means whereby the lift-off capability of the craft is enhanced and the craft is capable of providing an air cushion during descent.

DESCRIPTION OF DRAWINGS

FIG. 1 is a side sectional elevation of a rotorcraft employing the improvements of the present invention.

FIG. 2 is a sectional top elevation taken along line 2—2 of FIG. 1.

FIG. 3 is a detail view, partially in section, taken along line 3—2 of FIG. 1.

FIG. 4 is a detail view, partially in section, taken along line 4—4 of FIG. 1.

FIG. 5 is a detail view showing the operation of the shutters used in the present invention.

FIG. 6 is a partial sectional side elevation showing a modified form of the present invention.

DESCRIPTION OF THE INVENTION

Turning first to FIG. 1, the rotorcraft 10 has a rotor 14 supported by a rotor shaft 16 in suitable journals within the fuselage 11 of the craft 10. The rotor is driven by any type of motor situated at 18 through a belt 20 coupled to the rotor shaft 16. The length of the blades in rotor 14 may be reduced over the size for conventional rotors when used together with the other rotors of the present invention because of the additional lift obtained thereby. It is also contemplated that rigid rotors may be used in accordance with modern practice and that means for changing the pitch of the rotors can be employed in accordance with procedures well known in the art. A braking means 22 is provided to operate in conjunction with rotor shaft 16 so that the rotor 14 may be stopped in any selected position when desired.

Coupled to the rotor shaft 16 are two secondary rotors, the upper secondary rotor 24 and the lower secondary rotor 26. These are driven off of the rotor shaft 16 through a suitable gear box 28 which operates to counterrotate secondary rotor 26 to eliminate torque effects. The provision of this counterrotation and the synchronization of the rotors eliminates the need for the tail rotor commonly employed in conventional rotorcraft. The actual gear means employed in the gear box 28 are well known in the art. The lower rotor 26 being close to the ground increases the initial vertical lift when the craft is taking off and in addition creates an air cushion when the rotorcraft is descending. To increase the air cushion effect, a skirt may be added to vertical passage 30 to extend it closer to the ground. It is contemplated that rigid rotors would be employed for rotor 26. The upper rotor 24 is likewise a rigid rotor and operates to draw air into the vertical air passage 30 and supplies air for the lower rotor.

The vertical air passage 30 extends through the body of the rotorcraft 10 and operates to conduct air from top to bottom through the central portion of the craft. The lower portion of the air passage 30 is flared near the bottom at 31 in order to accommodate a maximum size lower rotor 26 for increased performance. Spiders 32 provide support from the interior of the passage 30 and provide journal means 33 for the rotor shaft 16. These spiders 32 also provide mounting means for the gear box 28. At the upper and lower openings to the vertical passage 30, there are situated assemblies of shutters 34. Shutters 34 are adapted to be opened during ascent and descent when the secondary rotors 24 and 26 are to be utilized. After ascent, for example, of the craft to a selected altitude, it is contemplated that the shutters 34 would then be closed thereby decreasing aerodynamic drag for horizontal flight. The details of the shutters are shown in FIG. 5 comprising a plurality of longitudinally supported rotatable plates 36 having beveled ends 38. These rotatable plates 36 are pivotal about their mounting points 40 so that they may be moved to a vertical position to permit the passage of the maximum amount of air therethrough. The provision of the beveled ends 38 permits the shutters to close to effectively shut off the flow of air. FIG. 5 shows the shutter numbers 36 tied together by actuating member 42, but this is merely an example of how the shutters may be actuated and there are undoubtedly other satisfactory means of accomplishing this end within the skill of persons in the art. FIG. 1 will show the disposition of the actuating number 42 extending forwardly into the passenger compartment 12.

The rotorcraft of the present invention is provided with a propeller 44 for driving the craft in horizontal flight. Of course, any suitable propulsion means may be used. The propeller 44 is driven through propeller shaft 46 through belt drive 48, shaft 50 and belt 52 which is in turn coupled to the motor pulley 54. There is situated along the longitudinal center line of the fuselage 11 a cylindrical air passage 56 having a front opening 58 behind the propeller 44. The propeller shaft 46 is mounted coaxially in air passage 56 by means of the two spiders 60 which support suitable journal means 62. FIG. 4 is a sectional view taken along line 4—4 of FIG. 1 showing the spider 60 and journal means 62 supporting the propeller shaft 46 in the air passage 56.

The central longitudinal air passage 56 extends through the vertical air passage 30 past the rearmost wall thereof and communicates with the rear engine compartment 13. The air passing through passage 56 thus provides cooling air for the engine 18 and is exhausted through aperture 64 formed in the rear of the engine compartment 13. A shutter similar to shutters 34 may be installed in passage 56 to shut off air flow when desired, for example, at high altitude where the engine may otherwise get too cool to operate efficiently.

As shown in FIGS. 1 and 2, a tail section consisting of horizontal and vertical control surfaces is supported by twin tail booms 66 which are joined to the rear of the fuselage 11 on each side of the exhaust aperture 64. There is a cross member 68 between the two tail booms 66 and this cross member 68 provides the fixed portion of the horizontal stabilizer. Hingedly mounted to the horizontal stabilizer 68 is the movable elevator control surface 70 which is mounted and is controllable in accordance with practice well known in the art. In the center of the horizontal stabilizer 68 there is mounted the vertical stabilizer 72 to which is pivotally mounted the rudder control surface 74. Again, the rudder 74 is mounted and is actuable in any manner well known in the art. The position of the control surfaces 74 and 70 is immediately in front of the exhaust aperture 64 whereby air leaving the exhaust aperture 64 is directed over these control surfaces. The result is to improve the controllability of the craft by supplying air pressure directly to the control surfaces. This feature, added to the counterrotation feature of rotor 26, counteracts the tendency of the craft to counterrotate with respect to the direction of rotation of the main rotor 14. In addition to the foregoing, an impeller 76 is mounted in the rearmost end of the axial air passage 56 by means of spider 78 and journal 80. This impeller 76 is driven by belt means 82 coupled to a pulley 84 mounted on the rotor shaft 16. It will be understood that all pulleys mentioned and shown herein may be of the variable speed or clutch type in order that any of the functions to be performed thereby may be disengaged or the speed varied as desired. With respect to pulley 84, clutch means is contemplated so that impeller 76 may be driven during the application of power to the rotors 14, 24 and 26 during which time relatively little air would otherwise be passing through passage 56, so that cooling air is provided to the motor 18 and air under pressure is supplied to the control surfaces. When the craft is moving forward, there may be sufficient air passing through passage 56 to supply the necessary cooling air and control surface air and in fact the movement of the impeller 76 might obstruct the flow of air rather than increase it. At such time, it may be desirable to permit impeller 76 to be free wheeling.

In the event of an engine failure, it is a common feature of rotorcraft to execute a descent and landing using autorotation. The rotor 14 would thus be turning. The connection of impeller 76 to rotor shaft 16 allows it to operate during a power-off descent. Under such conditions, air pressure will be supplied to the control surfaces so that good control can still be maintained.

As previously stated, the craft of the present invention may be operated either as a helicopter using the rotor 14 under power to provide both lift and forward thrust; as an autogiro using the rotor without power but freewheeling to provide lift and obtaining forward thrust from the propeller; or as a fixed wing aircraft, during which time it would be desired to stop the rotation of rotor 14. This may be done by the means of the brake device 20 but to prevent the rotor blade 14 from flapping, a hook-type arresting gear 86 is provided slidably mounted inside the front passenger compartment 12. The arresting gear 86 has a hook portion 88 which may be slid upwardly and hooked over one of the rotor blades 14 where it may secure the blade in such a manner as to prevent it from flapping and causing damage thereto. In addition, for fixed wing operation, foldable wing sections 90 are provided on both sides of the craft mounted by means of hinges 92 to the side of the fuselage 11. During operation as a rotorcraft, the wings can be maintained in the downwardly folded position as shown in FIG. 2 at 92a but for fixed wing horizontal flight of the most efficient type, the rotor would be secured as before mentioned and the wings extended as shown in the dotted lines at 92b. Between the wing hinge and the fuselage, an elevator control surface 91 is mounted. These surfaces 91 operate like ailerons to bank the craft in flight. An impeller 93 is mounted to provide positive air pressure on control surface 91.

Referring now to the partial sectional view shown in FIG. 6, this is a sectional view taken only of the central vertical air passage 30 showing the various elements therein in the same relationships as those shown in FIG. 1, however, FIG. 6 shows an additional feature which increases the performance of the rotorcraft of the present invention. This additional element is a bell-shaped housing 87 formed within the interior of the vertical passage 30. Housing 86 is mounted having its primary vertical axis positioned concentrically with respect to the rotor shaft 16 and is secured by the spiders 32 extending therethrough as shown. The function of the bell-shaped housing 87 is to divert the air flow after it passes rotor 24 so that the primary air flow is around the outer portions of the air passage 30 where the air pressure will be greater due to the higher speed of the outer ends of the rotor blades 24. When the air flow reaches the lower rotor 26, the primary air flow will be through the higher speed portions of that blade thereby increasing the efficiency of the lift provided by rotor 26. In addition, the flat bottom 89 of housing 87 enhances the downward thrust capability of rotor 26.

It will be noted that FIGS. 1 and 2 show only two seats in the passenger compartment 12, one obviously being for the pilot and the other for either a copilot or passenger. It is contemplated that the compartment 12 may be elongated forward of the vertical passage 30 to provide additional seating or cargo carrying space behind the two seats. This cargo space could be adapted to accommodate a stretcher or stretchers for rescue work.

While the drawings depict particular embodiments of the present invention, they are only examples of one means for carrying out my invention and it is contemplated that modifications might be made therein. For example, the elements of the drive mechanism may be changed for greater efficiency or reliability, and various forms of impellers might be used. In addition, the configuration of the tail section might be altered. It is the aim of the appended claims to cover all such changes and modifications as fall within the true scope and spirit of this invention.

I claim:
1. A rotorcraft comprising:
an upper rotor mounted above the fuselage of the craft, said upper rotor driven by a rotor shaft coupled to an engine; horizontal propulsion means mounted upon said craft; and
a vertically disposed, centrally located air passage, said air passage including means to conduct air vertically through the fuselage of the craft, said conducting means comprising one or more secondary rotors having a plurality of rotor blades, means for mounting said rotor blades in said air passage upon said rotor shaft, said secondary rotors including an upper rotor and a lower rotor, said upper rotor being situated near the upper end of said passage, said lower rotor being situated near the lower end of said passage, said vertical air passage having an outwardly flared bottom section whereby the lower end thereof is larger than the upper end, the diameters of each of said secondary rotors conforming to the diameters at the ends of said passage, and closure means for selectively closing said air passage.

2. A device of the type described in claim 1 wherein said vertical air passage is outwardly flared in bell-shaped fashion near the bottom portion thereof.

3. A rotorcraft comprising:
an upper rotor mounted above the fuselage of the craft;
horizontal propulsion means mounted upon said craft;
a vertically disposed, centrally located air passage, said air passage including means to conduct air vertically through the fuselage of the craft, and closure means for selectively closing said air passage;
a tail section, said tail section including horizontal and vertical control surfaces, ducting means formed in the fuselage of said rotorcraft for conducting air through said fuselage and directing it over said control surfaces; and
a pair of extendable wing sections, means for mounting said wing sections to the fuselage of said rotorcraft, said mounting means including means for selectively collapsing and extending said wing sections as desired.

4. A device of the type described in claim 3, further including; means mounted upon said rotorcraft for securing said upper rotor in an extended, nonrotative position.

5. A device of the type described in claim 4 wherein:
said upper rotor is driven by a rotor shaft coupled to an engine;

said conducting means comprising one or more secondary rotors having a plurality of rotor blades, means for mounting said rotor blades in said air passage upon said rotor shaft;

said vertical air passage having an outwardly flared bottom section whereby the lower end thereof is larger than the upper end, said secondary rotors including an upper rotor and a lower rotor, said upper rotor being situated near the upper end of said passage, said lower rotor being situated near the lower end of said passage, the diameters of each of said secondary rotors conforming to the diameter at the ends of said passage;

said secondary rotors in said air passage being coupled to a gear means, said gear means operative to drive one or more of said rotors counter to the direction of rotation of said upper rotor;

said vertical air passage closure means comprising upper and lower shutter means, and means coupled to said shutter means for actuating the same;

said ducting means comprising an axially disposed longitudinal passage extending from the front of said craft to a rear engine compartment, said passage being open at both ends, said engine being mounted in said engine compartment, said air passage adapted to direct the flow of air through said ducting means onto said engine, an exhaust port in the rear of said engine compartment, said exhaust port being so situated as to direct the air flow over said control surfaces; and said ducting means further including impeller means, said impeller means being coupled to drive means including clutch means, said drive means operative to selectively drive said impeller means from said engine or from said upper rotor.

6. A rotorcraft or the like comprising:

an upper rotor mounted above the fuselage of the craft, said upper rotor driven by a rotor shaft coupled to an engine;

a propeller mounted at the front of the fuselage and means coupling said propeller to said engine;

a pair of extendable wing sections, means for mounting said wing sections to the fuselage of said rotorcraft, said mounting means including means for selectively collapsing and extending said wing sections as desired, and means for securing said upper rotor in an extended, nonrotative position;

a vertically disposed centrally located air passage, said air passage having an outwardly flared bottom section whereby the lower end thereof is larger than the upper end, said air passage including means to conduct air vertically through the fuselage of the craft, said conducting means comprising one or more secondary rotors including an upper rotor and a lower rotor, means for mounting said rotor blades in said air passage upon said rotor shaft, said upper rotor being situated near the upper end of said passage, said lower rotor being situated near the lower end of said passage, the diameter of each of said secondary rotors conforming to the diameter at the ends of said passage; and closure means for selectively closing said air passage.

7. A device of the type described in claim 6 wherein said closure means comprises upper and lower shutter means, and means coupled to said shutter means for actuating the same.

8. A device of the type described in claim 6 wherein said secondary rotors are coupled to a gear means, said gear means operative to drive one or more of said rotors counter to the direction of rotation of said upper rotor.